US009055426B2

(12) United States Patent
Shah

(10) Patent No.: US 9,055,426 B2
(45) Date of Patent: *Jun. 9, 2015

(54) METHOD AND APPARATUS FOR DISABLING THE RF FUNCTIONALITY OF A MULTI-FUNCTION WIRELESS COMMUNICATION DEVICE WHILE MAINTAINING ACCESS TO LOCAL FUNCTIONALITY

(71) Applicant: Durham Logistics, LLC, Las Vegas, NV (US)

(72) Inventor: Nitin J. Shah, Cupertino, CA (US)

(73) Assignee: Durham Logistics, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/202,566

(22) Filed: Mar. 10, 2014

(65) Prior Publication Data
US 2014/0194098 A1 Jul. 10, 2014

Related U.S. Application Data

(63) Continuation of application No. 13/453,992, filed on Apr. 23, 2012, now Pat. No. 8,706,161, which is a continuation of application No. 13/209,813, filed on Aug. 15, 2011, now Pat. No. 8,175,642, which is a
(Continued)

(51) Int. Cl.
*H04W 8/22* (2009.01)
*H04W 52/02* (2009.01)
*H04W 4/12* (2009.01)

(52) U.S. Cl.
CPC .............. *H04W 8/22* (2013.01); *H04W 52/028* (2013.01); *Y02B 60/50* (2013.01); *H04W 4/12* (2013.01)

(58) Field of Classification Search
CPC ......... H04W 4/06; H04W 8/183; H04W 4/00; H04W 4/12; H04W 4/16; H04W 52/0274
USPC ................ 455/556.1, 556.2, 557, 574, 343.1, 455/343.5, 418, 419
See application file for complete search history.

(56) References Cited

U.S. PATENT DOCUMENTS 4,035,779 A * 7/1977 Birney et al. ................. 711/164
4,972,457 A 11/1990 O'Sullivan
5,193,212 A 3/1993 Son
(Continued)

FOREIGN PATENT DOCUMENTS

EP 1182901 2/2002
JP 11017829 1/1999

OTHER PUBLICATIONS

Stolowitz Ford Cowger LLP; Related Case Listing: Mar. 4, 2014; Portland, OR; 1 Page.

*Primary Examiner* — Minh D Dao
(74) *Attorney, Agent, or Firm* — Stolowitz Ford Cowger LLP

(57) ABSTRACT

A method and apparatus for disabling the communication functionality (i.e., disabling the transmission and/or reception of RF signals) of an integrated device, while still providing access to the local functionality of such device. A control and select function, such as a switch that is implemented by hardware or software or a combination thereof, is provided in an integrated device to allow the end user of the device to access the local data processing functionality of the device, even while the wireless communication functionality of such device is disabled.

19 Claims, 1 Drawing Sheet

Related U.S. Application Data continuation of application No. 12/571,372, filed on Sep. 30, 2009, now Pat. No. 8,019,384, which is a continuation of application No. 11/496,021, filed on Jul. 28, 2006, now Pat. No. 7,647,070, which is a continuation of application No. 09/745,493, filed on Dec. 22, 2000, now Pat. No. 7,356,351.

(56) References Cited

U.S. PATENT DOCUMENTS

| | | | | |
|---|---|---|---|---|
| 5,337,346 | A | 8/1994 | Uchikura | |
| 5,420,599 | A | 5/1995 | Erkocevic | |
| 5,513,212 | A | 4/1996 | Bremer | |
| 5,519,386 | A | 5/1996 | Tobergte | |
| 5,519,763 | A | 5/1996 | Namekawa | |
| 5,584,054 | A | 12/1996 | Tyneski | |
| 5,752,199 | A | 5/1998 | Scott | |
| 5,894,595 | A | 4/1999 | Foladare | |
| 5,956,651 | A | 9/1999 | Wilkie | |
| 5,964,319 | A | 10/1999 | Weingarden | |
| 5,983,073 | A | 11/1999 | Ditzik | |
| 6,038,294 | A | 3/2000 | Tran | |
| 6,061,553 | A | 5/2000 | Matsuoka | |
| 6,085,096 | A | 7/2000 | Nakamura | |
| 6,088,576 | A | 7/2000 | Sone | |
| 6,173,352 | B1 | 1/2001 | Moon | |
| 6,233,464 | B1 * | 5/2001 | Chmaytelli | 455/556.2 |
| 6,343,213 | B1 * | 1/2002 | Steer et al. | 455/411 |
| 6,397,082 | B1 | 5/2002 | Searle | |
| 6,434,371 | B1 | 8/2002 | Claxton | |
| 6,453,182 | B1 | 9/2002 | Sprigg | |
| 6,490,455 | B1 | 12/2002 | Park | |
| 6,512,917 | B1 | 1/2003 | Hiramatsu | |
| 6,549,767 | B1 | 4/2003 | Kawashima | |
| 6,556,845 | B1 | 4/2003 | Ide | |
| 6,625,478 | B1 | 9/2003 | Nonogaki | |
| 6,633,769 | B2 | 10/2003 | Shoobridge | |
| 6,643,517 | B1 | 11/2003 | Steer | |
| 6,643,527 | B2 | 11/2003 | Satoh | |
| 6,832,093 | B1 | 12/2004 | Ranta | |
| 6,928,300 | B1 * | 8/2005 | Skinner et al. | 455/556.2 |
| 7,039,425 | B1 | 5/2006 | Mazawa | |
| 7,061,365 | B2 | 6/2006 | Izumi | |
| 7,181,229 | B2 * | 2/2007 | Singh et al. | 455/456.4 |
| 7,260,390 | B1 | 8/2007 | Skinner | |
| 7,272,025 | B2 * | 9/2007 | Hawley | 363/49 |
| 7,289,832 | B1 | 10/2007 | Enoki | |
| 7,356,351 | B1 * | 4/2008 | Shah | 455/556.1 |
| 7,647,070 | B2 | 1/2010 | Shah | |
| 8,019,384 | B2 | 9/2011 | Shah | |
| 8,175,642 | B2 | 5/2012 | Shah | |
| 2002/0123372 | A1 | 9/2002 | Kobayakawa | |
| 2003/0129996 | A1 | 7/2003 | Maloney | |
| 2004/0087318 | A1 | 5/2004 | Lipovski | |
| 2004/0198306 | A1 * | 10/2004 | Singh et al. | 455/345 |
| 2006/0158909 | A1 * | 7/2006 | Hawley | 363/21.12 |
| 2006/0186994 | A1 * | 8/2006 | Lin et al. | 340/5.74 |
| 2007/0060212 | A1 | 3/2007 | Shah | |
| 2010/0022272 | A1 | 1/2010 | Shah | |
| 2011/0300860 | A1 | 12/2011 | Shah | |
| 2012/0208508 | A1 | 8/2012 | Shah | |

* cited by examiner

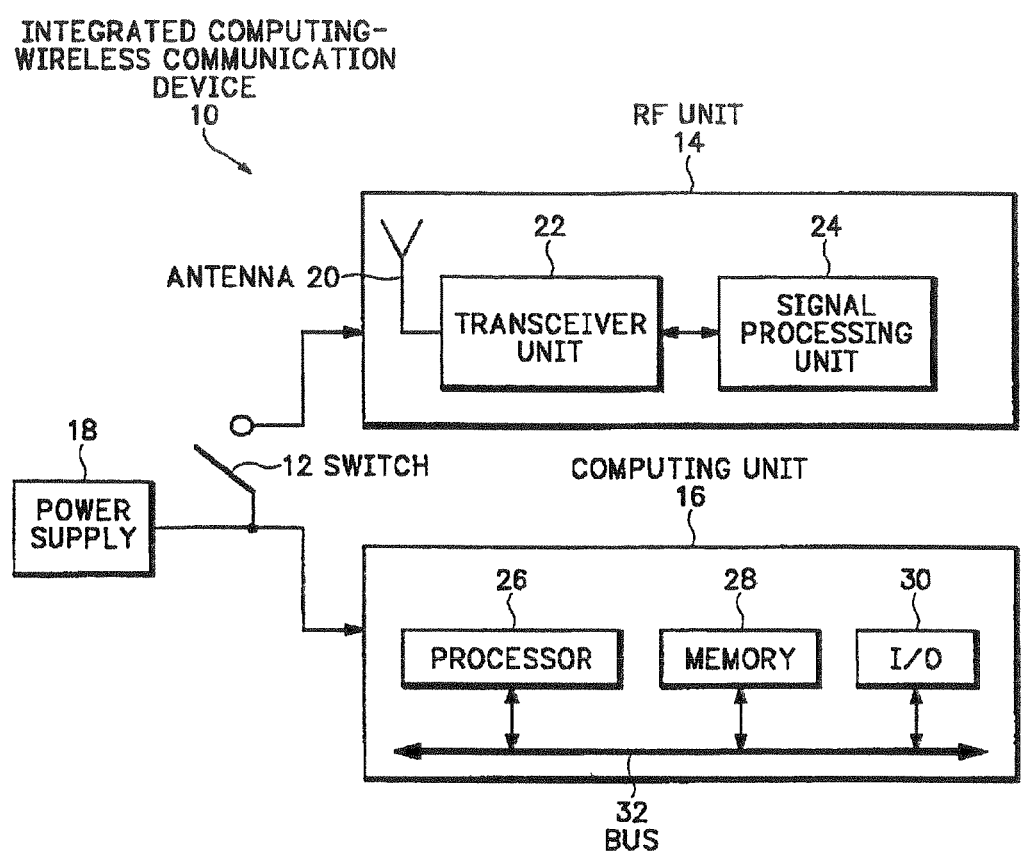

METHOD AND APPARATUS FOR DISABLING THE RF FUNCTIONALITY OF A MULTI-FUNCTION WIRELESS COMMUNICATION DEVICE WHILE MAINTAINING ACCESS TO LOCAL FUNCTIONALITY

RELATED APPLICATIONS

This application is a continuation of and claims priority to U.S. patent application Ser. No. 13/453,992, filed Apr. 23, 2012, now issued as U.S. Pat. No. 8,706,161, which is a continuation of and claims priority to U.S. application Ser. No. 13/209,813, filed Aug. 15, 2011, now issued as U.S. Pat. No. 8,175,642, which is a continuation of and claims priority to U.S. application Ser. No. 12/571,372, filed Sep. 30, 2009, now issued as U.S. Pat. No. 8,019,384, which is a continuation of and claims priority to U.S. patent application Ser. No. 11/496,021, filed Jul. 28, 2006, now issued as U.S. Pat. No. 7,647,070, which is a continuation of and claims priority to U.S. patent application Ser. No. 09/745,493, filed Dec. 22, 2000, now issued as U.S. Pat. No. 7,356,351, all of which we incorporate by reference.

FIELD OF THE INVENTION

The present invention relates to the field of wireless communications systems, and in particular, to a method and system for disabling the radio functionality of a multifunction communication device, while continuing to provide access to the local, non-radio functionality (e.g., information access and/or manipulation functionality) of such device.

BACKGROUND OF THE INVENTION

The utilization and functionality of end user portable devices is increasingly growing more diverse than the traditional automobile-mounted or even portable cellular telephone, which was exclusively a communications tool, and thus had virtually no practical functionality without the radio link in operation. In contrast to such early cellular telephones, which provided little more than wireless/RF communications functionality, modern systems increasingly integrate communication functionality with other types of non-communication or "local" functionality in one integrated device. On the other hand, portable appliances, such as laptop computers, personal digital assistants (PDAs), and even gaming devices, that traditionally provided only "local functionality" have evolved into multi-function devices that provide hard-wired or even wireless communication functionality, as well as "local computing functionality." In sum, traditional portable data storage/manipulation devices and traditional wireless communication devices have evolved and merged into multi-function integrated portable devices that provide both communication functionality and local functionality.

As used herein, an "integrated" or "multifunction" communication device or simply "integrated device" includes devices that integrate both wireless communication functionality as well as non-communication functionality (e.g., a cellular device that incorporates data processing/computing functionality) into one device, as well as two separate devices that are interfaced to provide both communications and local functionality (e.g., a laptop computer or PDA or other portable device that is interfaced with another device, such as a wireless modem or other wireless communication module or PC card, such as a PCMCIA card, to provide both information access and/or manipulation functionality as well as communication functionality). The term "local functionality" is used herein to denote non-communication functionality, such as information access or manipulation (e.g., gaming, address storage/retrieval, execution of one or more applications such as word processing, spreadsheet, etc.). In other words, "local functionality" is used herein to denote various functionality of an integrated device that may be enjoyed by an end user while the device is not transmitting and/or receiving RF signals.

Because modern integrated devices, such as multi-function cellular phones or portable data processing devices that also provide wireless communication functionality, are not limited exclusively to communications functionality, but may include local functionality, such devices may provide significant utility even when not "connected" to (i.e., receiving signals from, or transmitting signals to) an external entity through a wireless communication channel.

Unfortunately, modern integrated devices have suffered from a number of limitations. For instance, when an integrated cellular telephone is in an "idle" state (i.e., the power is on, and the integrated device may receive calls, transmit and/or receive control signals sent by or to nearby base stations, respectively, or otherwise be enabled to transmit/receive RF signals), a received call may cause a disruption to the end user in certain situations, such as when the end user is in a meeting, in a classroom, etc. Even if a traditional voice or data "call" is not received, other information exchange, such as periodic updates, including voicemail notifications, control/broadcast information exchange with an external entity (e.g., a base station), etc., may cause disruption or other undesirable effects in certain situations. In order to prevent such disruption, the end user may forgo the use of the integrated device altogether, thereby not being able to access the local functionality of the device. Moreover, because power conservation is a significant issue concerning mobile/portable integrated devices, which generally use rechargeable batteries that provide limited use time, the idle state of the integrated device may unnecessarily consume power, especially when the end user of such a device intends to access exclusively the local functionality of the device. Finally, the use of such integrated devices is typically altogether precluded in certain restricted areas (e.g. aboard aircraft), where the electromagnetic radiation caused by the RF portions of such devices, which may periodically transmit control or other types of signals and/or receive the same, may interfere with navigational or safety equipment.

As such, even though modem integrated devices potentially provide both communications functionality and local functionality, such local functionality in many circumstances may not be available because of the undesirable effects caused by the communications functionality, such as disruption, unnecessary consumption of power, interference with safety or navigational equipment in restricted areas, etc.

Thus, what is needed is a method and apparatus for increasing access to the local functionality of integrated devices.

SUMMARY OF THE INVENTION

A method and apparatus is provided for disabling the communication functionality (i.e., disabling ability of the device to transmit and/or receive RF signals) of an integrated device, while still providing access to the local functionality of such device. A control and select function, such as a switch that is implemented by hardware or software or a combination thereof, is provided in an integrated device to allow the end user of the device to access the local data processing functionality of the device, even while the wireless communication functionality of such device is disabled.

BRIEF DESCRIPTION OF THE DRAWING

FIG. 1 is a block diagram of an integrated computing-wireless communication device in accordance with one embodiment of the invention.

DETAILED DESCRIPTION

The present invention provides method and apparatus is provided for disabling the communication functionality of an integrated device (i.e., disabling the ability of the device to transmit and/or receive RF signals), while still providing access to the local functionality of such device. In one embodiment, a control and select function, such as a switch or other toggle or selecting mechanism, which mechanism may be implemented by hardware or software or a combination thereof, is provided in an integrated computing-wireless device, to allow an end user of the device to disable transmission and/or reception of signals associated with the radio communication portion of the device, while being able to access the local functionality of the device. Such local functionality may include, but is not limited to, access to one or more data storage areas for entry or retrieval of data (e.g., addresses, phone numbers, or other information), utilization of software applications (e.g., word processing, scheduling, spreadsheet, calculator, etc.), games, multimedia (e.g., playing video and/or audio, etc.), and/or other local data processing features and functions that can be performed even during such time that the device does not receive signals from, or transmit signals to, an external entity. The external entity may include a cellular base station or other wireless communication device that can enable transfer of voice and/or data between the integrated device and the external device and/or a network, such as the Internet, public switched telephone network (PSTN), etc.

In the following description, numerous specific details are set forth to provide a thorough understanding of the invention and its various embodiments. However, it should be appreciated that the invention may be practiced without these specific details. In other instances, well-known circuits, structures, and techniques have not been shown in detail in order to avoid obscuring the invention. It should further be noted that the various elements of the invention may be implemented in hardware (e.g., circuitry), software (e.g., machine-executable instructions), or a combination thereof.

FIG. 1 is a block diagram of an integrated communication device, in accordance with one embodiment of the invention. In one embodiment, the integrated device 10 shown in FIG. 1 represents a multi-function cellular telephone that provides wireless voice and/or data communication functionality, as well as local functionality, such as information access and/or manipulation. In an alternative embodiment, the device 10 represents a portable data processing device (e.g., a personal digital assistant (PDA), a laptop computer, a gaming device, or other portable device that enables information access and/or manipulation or other local functionality) that may also provide wireless communication functionality. In such an embodiment, the portable computing device may include integrated or modular radio/wireless communication functionality. In the latter case, the device 10 may include, for example, an installable-removable PCMCIA card/modem or other installable module that provides voice and/or data wireless and/or wired modem functionality. In yet other embodiments, the integrated device 10 may represent one or more types of devices, including "portable multifunction appliance (s)," that provide both local functionality and wireless communication functionality.

As shown in FIG. 1, the integrated device 10 includes a power supply 18 to provide power to a computing unit 16 exclusively, or selectively, as provided by a switch 12 coupled to the power supply 18 and the computing unit 16, to provide power both to the computing unit 16 as well as a radio communication or RF unit 14. The power supply, in one embodiment, includes a direct current (DC) output rechargeable battery. In alternative embodiments, the power supply may instead, or in addition, include disposable battery power, AC outlet power, etc.

The RF unit 14 includes hardware, software, or combination thereof to enable wireless communication between the device 10 and an external entity, which may be a cellular base station or other transceiving device coupled to a voice network (e.g., the public switched telephone system (PSTN) or other voice network) and/or a data network (e.g., a WAN, such as the Internet, an intranet/LAN) or a combination voice/data network, for enabling the integrated device 10 to send and/or receive voice and/or data. To aid in the understanding of the invention, the RF unit 14 is shown to include an antenna 20, a transceiver unit 22, and a signal processing unit 24. It should be appreciated, however, that the RF unit 14 may generally include various other circuitry and/or software modules, such as one or more modulators, demodulators, analog-to-digital circuits (ADCs), digital-to-analog circuits (DACs), filters, etc. Also, the transceiving unit 22, for example, may represent one or combination of a receiver, a transmitter, a receive (Rx)/transmit (Tx) switch, etc. The transmitter portion of the transceiving unit 22 may include a local oscillator, for example, and in general, the transceiving unit 22 may include various known RF components and/or software modules to allow wireless reception and transmission of information embodied in an electromagnetic radiation.

The computing unit 16 provides the local functionality of the device 10. The computing unit 16 is shown to include a processor 26, a memory 28, and an input/output (I/O) unit 30, all coupled to a bus 32. The processor 26 includes at least one processor to provide data processing functionality to the device 10. Such functionality may be exclusively local functionality, or may involve communication between the device 10 and an external device (e.g., Web browsing, sending/receiving email, files, multimedia, voice, etc.). Thus, the computing unit 16 may function exclusive of the RF unit 14, or in conjunction therewith. The external device may be another integrated device, a base station that employs an adaptive antenna array (or "smart antenna system), a conventional antenna system base station, etc. In turn, such external device may be coupled to a voice and/or data network (e.g., the PSTN, Internet, an intranet, etc.) to facilitate the exchange of voice and/or date between the integrated device 10 and the network. The memory 28 represents one or more storage devices/media for storing information, including data and/or machine-executable instructions. As such, the memory 28 may include one or a combination of random access memory (RAM), read-only memory (ROM), flash memory, hard disk, floppy disk optical storage, such as CDROM, DVD, etc.

The I/O unit represents one or more user input and output interfaces and devices, and in one embodiment, includes a user-viewable screen, such as a liquid crystal display (LCD), as well as other I/O components, such as an alpha-numeric keypad and/or a touch screen, a joystick, a pointing device, a speaker, a microphone, etc.

In one embodiment of the invention, the switch 12 is coupled to the power supply 18 and the computing unit 16, and may be toggled to couple the power supply 18 to the RF unit 14 to selectively deliver or disable the delivery of power from the power supply 18 to the RF unit 14. In one embodiment of the invention, the switch 12 provides two modes of "on-power operation" for the integrated device 10. A first mode of operation is provided in which both the radio communication unit 14 is enabled (i.e., the RF unit 14 may receive signals from and/or transmit signals to an external entity) and the computing unit 16 is enabled to provide local functionality. In the first mode of operation, the integrated device 10 may provide communication functionality and/or radio functionality. For example, the integrated device 10, in the first mode, may provide network functionality, such as Web browsing, sending/receiving email, streaming audio/video, voice-over-IP, video conferencing, or other functions that involve wireless voice and/or data communication between the device 10 and an external device. In one embodiment, the device 10 may, in addition to providing wireless communication functionality, also provide wired communication functionality, for example, by providing a hard-wired Ethernet or public switched telephone network (PSTN) interface.

In addition, and in accordance with one embodiment of the invention, the switch 12 provides a second mode of operation in which the radio communication unit 14 is disabled, such that the radio communication unit 14 does not receive power from the power supply 18, and thus, the RF unit 14 may not receive or transmit signals. In the second or "radio mute" mode of operation, the computing unit 16 may still receive power, and thus provide access to the local functionality of the integrated device 10. This second mode may provide increased accessibility to local functionality relative to prior art integrated devices.

It should be appreciated that the switch 12 may be implemented in hardware or software or a combination thereof. For example, in one embodiment, a user-viewable screen of the device 10 may include a "soft-key" that may be selected by a user to disable the radio communication unit 14. For example, a selectable icon may appear on the screen of the device 10, which icon, when selected, disables the RF unit 14. In one embodiment, the RF unit 14 is disabled by switching off the power supply to the transmitter and receiver portions of the radio communication unit 14. In addition to or in lieu of the "soft-key," mechanism, one embodiment of the invention includes a depressable mechanical or touch-sensitive button or display icon that a user may toggle to disable the radio communication 14 (e.g., by terminating or switching off power delivery to the radio communication unit 14).

In yet another embodiment, the switch 12 may be implemented, or controllable, at least in part by an external device. In this embodiment, an external device, such as a base station or other device that is coupled to a voice and/or data network may trigger the device 10 to operate in the first or second mode. For example, the end user of the device 10 may program a system coupled to the network to cause the device 10 to operate in the first or second mode at a predetermined time (e.g., when the end user expects to board an aircraft, or go to a meeting, or any other time defined by the end user or other programmer). Furthermore, in one embodiment, the switch is implemented at least in part in a certain areas of a network, such as in a geographic area that includes at least a portion of a restricted area, such as an airport. In this embodiment, a broadcast signal is transmitted in such areas of the network to one or integrated devices, such as the device 10, to cause each such device to operate in the second (or first) mode. Therefore, it should be appreciated that the switch 12 may be implemented in a number of ways that may include one or combination or hardware and software, and furthermore, that the switch may be implemented or controllable at least in part on one or more devices external to the integrated device 10.

Furthermore, it should be appreciated that while one embodiment is shown that includes a single power supply, alternative embodiments may include separate power supplies for each of the RF unit 14 and the computing unit 16, along with a switching mechanism to disable the former power supply. In alternative embodiments, the RF unit 14 may be disabled by disabling just one (or possibly more) portions of the RF unit to disable RF signal transmission or reception by the device 10 that may be disruptive or which may cause interference in restricted areas, such as aircraft. For instance, in one alternative embodiment, the local oscillator of the RF unit may be disabled by software or a switch implemented by hardware. In another embodiment, the antenna 20 may be decoupled from the transceiver unit 22 by a switch. In yet another embodiment, the communication functionality may be disabled by increasing the electromagnetic shielding of the device 10 (e.g., by having an antenna that may be retracted into a shielded area, such as provided by an electromagnetic coil.), such that the wireless communication functionality of the device is effectively disabled. Still, the embodiments described may be modified by those having skill in the art to provide a selective mechanism for disabling the wireless communication functionality of an integrated device, while maintaining access to local functionality.

In one embodiment of the invention, the I/O unit 30 also includes an indicator to indicate whether the device 10 is operating in the second mode (and/or first mode). For example, in one embodiment, an LED and/or icon on the display of the device 10 may provide such indication. In addition or in lieu of a visual indication, the device 10 may also include an audible indicator to signal whether the device 10 is operating in the first or second mode of operation. In one embodiment, when the second mode of operation is selected, the device 10 transmits a notification to an external device just prior to operating in the second mode (i.e., prior to disabling the radio communication functionality) that the device 10 is entering the "radio mute" mode. As such, the external device may perform certain functionality in accordance with such notification (e.g., allocate additional bandwidth to other devices, track and/or store incoming data or voice requests intended for the device 10, such as voicemails, incoming data or voice calls, etc.).

It should be appreciated that in alternative embodiments, one or more circuits or devices may be shared between the RF unit 14 and the computing unit 16. For example, a processor may provide signal processing functionality to the RF unit 14, while also providing local functionality (e.g., execution of applications, storage/retrieving of data, etc.) associated with the computing unit 16. For instance, the processor 26 may include one or more general-purpose processors to provide signal processing and data processing functionality to the RF unit 14 and the computing unit 16, respectively. As such, the switch 12 may merely disable (at least a portion of) the transceiver unit 22 and/or the antenna 20, such that the device 10 may still provide local functionality while communication functionality is disabled (i.e., RF signals are not being transmitted and/or received by the device 10).

Although the invention has been described with reference to several embodiments that provide increased access to the local functionality of integrated computing-wireless devices, it will be appreciated that various alterations and modifications may be possible without departing from the spirit and scope of the invention, which is best understood by the claims that follow.

The invention claimed is:

1. A method, comprising:
    operating a first processing device in a first mode to communicate with a second processing device and to execute applications local to the first processing device;
    operating the first processing device in a second mode to disable communications with the second processing device and to maintain execution of the applications local to the first processing device; and
    transmitting a notification message to indicate that the first processing device is switching from the first mode to the second mode.

2. The method of claim 1, wherein the first mode is configured to allow wireless communication.

3. The method of claim 1, wherein the second mode is configured to disable at least a portion of wireless communication.

4. The method of claim 1, wherein transmitting the notification message comprises wirelessly transmitting the notification message from the first processing device to indicate that the first processing device is switching from the first mode to the second mode.

5. The method of claim 1, further comprising retrieving a communication intended for the first processing device stored in a third processing device during a time the first processing device operates in the second mode.

6. The method of claim 1, further comprising disabling at least a portion of radio functionality of the first processing device during a time the first processing device operates in the second mode.

7. The method of claim 1, wherein the second mode comprises airplane mode.

8. The method of claim 1, further comprising switching the first processing device from operating in the first mode to the second mode in response to receiving a switching control signal at the first processing device.

9. The method of claim 1, wherein the applications local to the first processing device comprise productivity software, contact information software, or gaming software.

10. A device, comprising:
    a memory device configured to store instructions defining executable code for at least one application;
    a processing device configured to execute the instructions stored in the memory device to:
        communicate with an external device in a first mode;
        at least partially disable communication with the external device without disabling execution of the at least one application in a second mode; and
        switch between the first mode and the second mode in response to receiving a switch signal;
        transmit a notification message configured to indicate that the device switched from the first mode to the second mode.

11. The device of claim 10, wherein the processing device is configured to execute the instructions further to wirelessly communicate with the external device in the first mode.

12. The device of claim 10, wherein the processing device is configured to execute the instructions further to at least partially disable wireless communication with the external device in the second mode.

13. The device of claim 10, wherein the processing device is configured to execute the instructions further to retrieve a communication stored externally to the device during a time the device operates in the second mode.

14. The device of claim 10, wherein the second mode comprises airplane mode.

15. The device of claim 10, wherein the processing device is configured to execute the instructions further to receive the switching signal from the external device.

16. A non-transitory computer-readable medium having stored thereon instructions that, when executed by a processing device, cause the processing device to perform operations comprising:
    communicating with a base station in a first mode;
    disabling communication with the base station while maintaining local functionality in a second mode; and
    transmitting a notification to the base station indicating a switch between the first mode and the second mode in response to receiving a switch signal.

17. The non-transitory computer-readable medium of claim 16, wherein execution of the instructions causes the processing device to perform operations further comprising wirelessly communicating with the base station in the first mode.

18. The non-transitory computer-readable medium of claim 16, wherein execution of the instructions causes the processing device to perform operations further comprising at least partially disabling wireless communication with the base station in the second mode.

19. The non-transitory computer-readable medium of claim 16, wherein execution of the instructions causes the processing device to perform operations further comprising retrieving communications from an external source stored in the external source during the second mode.

* * * * *